(12) United States Patent
Boulton

(10) Patent No.: US 6,640,489 B1
(45) Date of Patent: Nov. 4, 2003

(54) COLLECTION AND DISPOSAL DEVICE

(75) Inventor: David Boulton, Rotherham (GB)

(73) Assignee: Bug Buster Limited, Rotherham (GB)

( * ) Notice: Subject to any disclaimer, the term of this patent is extended or adjusted under 35 U.S.C. 154(b) by 0 days.

(21) Appl. No.: 10/069,254

(22) PCT Filed: Aug. 18, 2000

(86) PCT No.: PCT/GB00/03167

§ 371 (c)(1),
(2), (4) Date: Mar. 11, 2002

(87) PCT Pub. No.: WO01/13717

PCT Pub. Date: Mar. 1, 2001

(30) Foreign Application Priority Data

Aug. 19, 1999 (GB) ............................... 9919607

(51) Int. Cl.⁷ ................................................ A01M 1/06
(52) U.S. Cl. ....................................................... 43/139
(58) Field of Search .......................................... 43/139

(56) References Cited

U.S. PATENT DOCUMENTS

| | | | | |
|---|---|---|---|---|
| 1,308,497 A | * | 7/1919 | Jolly | 43/139 |
| 1,377,201 A | * | 5/1921 | Jolly | 43/139 |
| 1,797,557 A | * | 3/1931 | Stine et al. | 43/139 |
| 3,965,608 A | * | 6/1976 | Schuman | 43/139 |
| 4,074,458 A | * | 2/1978 | Catlett | 43/139 |
| 4,780,986 A | * | 11/1988 | Broomfield et al. | 43/139 |
| 4,817,330 A | * | 4/1989 | Fahringer | 43/139 |
| 4,858,376 A | * | 8/1989 | Reed | 43/139 |
| 5,052,147 A | * | 10/1991 | Broomfield et al. | 43/139 |
| 5,222,322 A | * | 6/1993 | Mastromonaco | 43/139 |
| 5,402,598 A | * | 4/1995 | Wade et al. | 43/139 |
| 6,202,343 B1 | * | 3/2001 | Mah | 43/139 |
| 6,226,919 B1 | * | 5/2001 | Septer | 43/139 |

FOREIGN PATENT DOCUMENTS

| | | | | |
|---|---|---|---|---|
| DE | 3225330 B1 | * | 7/1982 | |
| DE | 9116389 B1 | * | 9/1992 | |
| DE | 29615145 B1 | * | 1/1997 | |
| DE | 29711643 B1 | * | 10/1997 | |
| EP | 129504 A1 | * | 12/1984 | |
| EP | 941660 A1 | * | 9/1999 | |
| GB | 2236467 B1 | * | 4/1991 | |
| WO | WO-84/00280 A1 | * | 2/1984 | 43/139 |

* cited by examiner

*Primary Examiner*—Darren W. Ark
(74) *Attorney, Agent, or Firm*—Rohm & Monsanto, PLC

(57) ABSTRACT

A device is provided for the collection and disposal of insects and similarly sized detrital objects. The device includes an air inlet end through which air can be entrained, and an air outlet from which said entrained air is expelled. The device also includes a hollow duct portion through which entrained air passes and a filter means provided between the inlet and the outlet which prevent insects from being expelled through the outlet. Means are provided to create a pressure differential between the air inlet and air outlet of the device, such that air is entrained in the inlet and drawn through the duct portion of the device towards the outlet, additionally passing through the filter. The pressure differential is sufficient to entrain air, insects and/or detritus into the duct portion and the air path defined through the device is substantially unhindered so that entrained insects and detritus can escape from the device along the same path by which they were entrained ultimately exiting from the inlet end of the duct when the pressure differential is reduced, eliminated or reserved.

9 Claims, 4 Drawing Sheets

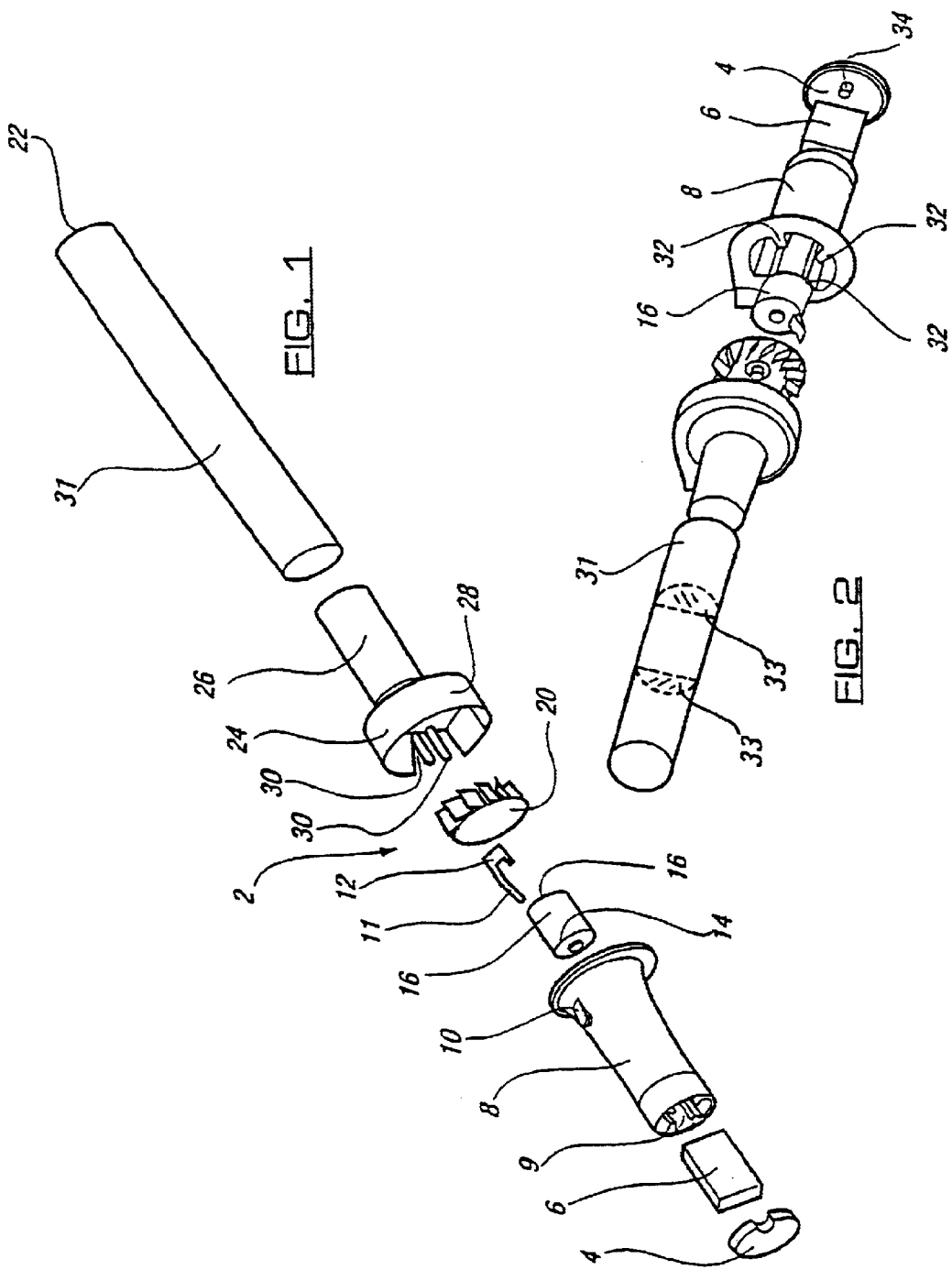

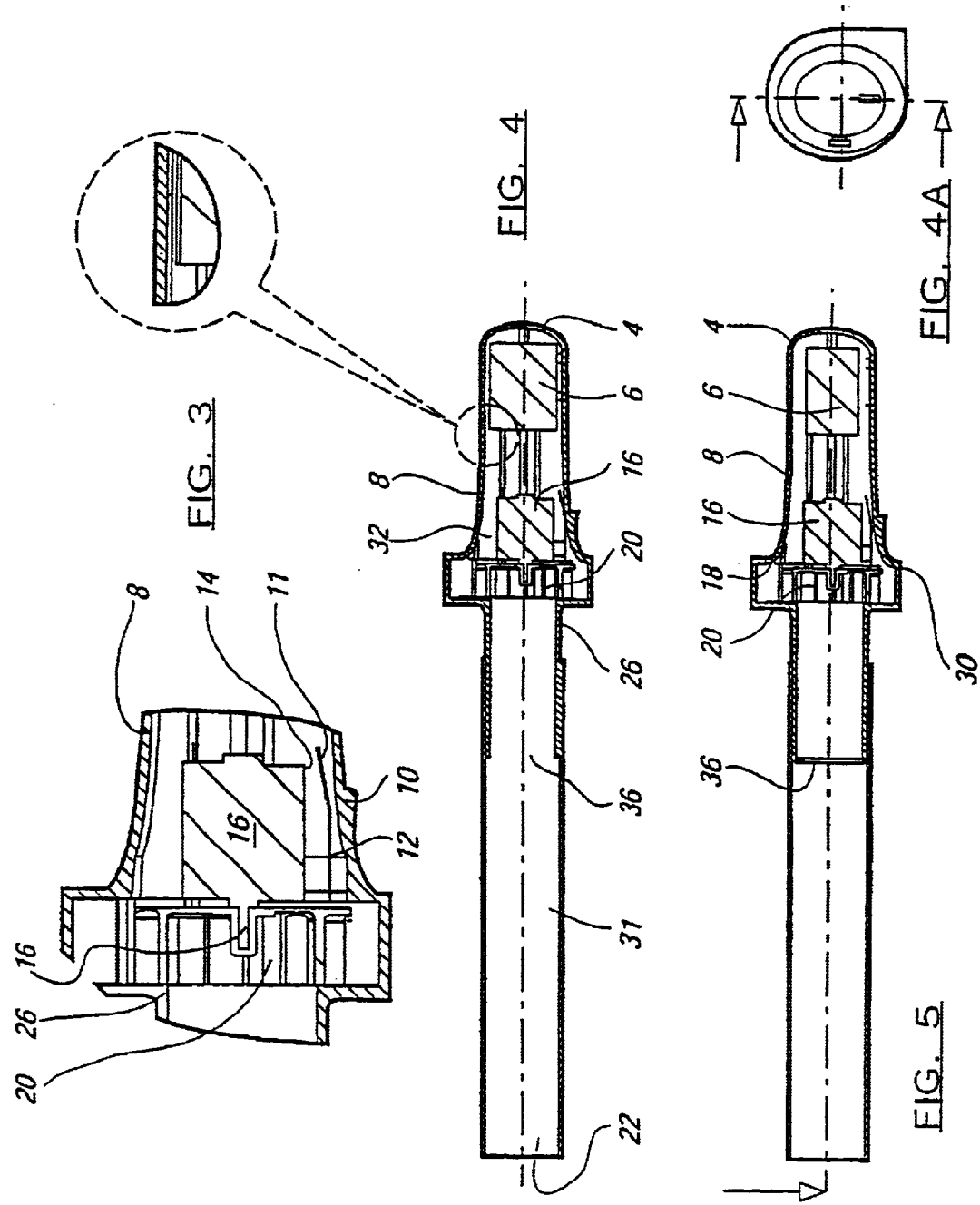

COLLECTION AND DISPOSAL DEVICE

BACKGROUND OF THE INVENTION

1. Field of the Invention

This invention relates to a collection and disposal device, and more particularly to an insect collection and disposal device, but it will be immediately understood from the following description that the device could easily be used to collect and dispose of other small objects in a convenient and simple manner.

2. Description of the Prior Art

There are a number of currently available devices used to dispose of living insects within domestic and office premises, as the presence of said insects can be distracting and also unhygienic in premises where food is prepared and eaten. The most common device is a swatter provided having a generally flexible elongate handle and an enlarged planar swatting panel which may be perforated. As is well known, such devices are used to swat the insect against a surface such as a work surface or window pane, whereafter the dead insect is removed from the surface, and the surface is then cleaned.

Alternative devices include electric usually wall mounted apparatus which incorporate an incandescent, electrified tube or panel to which the insects are drawn and electrocuted on making contact therewith, or chemical "fly papers" which release chemicals into the atmosphere which are either toxic to the insects thus killing the same, or are appealing to insects such that they are drawn towards the fly paper and make contact therewith, whereupon they adhere to the fly paper and ultimately die thereon.

It will be appreciated that the devices mentioned above are all inhumane in that the insect is ultimately exterminated in or on the device, but it should also be pointed out that there is a requirement for all these devices to be cleaned intermittently. On the one hand the build up of dead insects could be unhygienic and unsightly, and on the other hand the efficacy of the device is often impaired by the dead insects which accumulate thereon.

U.S. Pat. No. 4,918,857 to Wade and others discloses a hand-held device which can be either battery or mains powered and which comprises an electric motor driving a fan which entrains air through a first open end of the device and expels said air through a further opening located downstream of the fan. The device further comprises, as an essential element of the invention described in this U.S. Patent, a disposable cartridge which may optionally be lined with a chemical "fly paper" or other adhesive coating and which at a first end includes a deflectable flap member and at a second end a filtering member. The cartridge may be either integrally formed within a tube through which air is entrained to flow by the fan or may be a separate item adapted to be removed from the device and replaced after use, but in either case the power of the fan and the resiliency of the flap must be chosen such that the flap is deflected into an open condition when air is flowing through the device. In this manner, an insect, whether living or dead, can be sucked into the first open end of the device as the air is entrained therein, past the open flap and into the cartridge. The insect and any other detritus is removed from the air stream containing same by the filter provided at the alternate end of the cartridge whereafter the air is expelled through the second opening of the tube. The insect and other detritus is retained within the cartridge where it either expires through lack of oxygen, or is actively exterminated as a result of the chemicals being released by the fly paper or other chemical coatings provided in said cartridge.

Although the above device may be considered an improvement on the common and currently used devices from the perspective of convenience, it remains the intention of the device to ultimately exterminate the insects trapped in the cartridge. Furthermore, the design of the device is intricate, complex and has a number of different components which would require to be manufactured individually, and accordingly the cost of the device may be prohibitive, especially when some of the conventional insect extermination means are relatively inexpensive.

It is an object of this invention to provide an insect collection and disposal device which is inexpensive, humane, convenient and simple to operate and control, and which can be relatively inexpensively manufactured.

SUMMARY OF THE INVENTION

According to the invention there is provided a device for the collection and disposal of insects and similarly sized detrital objects, said device having an air inlet end through which air can be entrained, and an air outlet from which said entrained air is expelled, said device also having a hollow duct portion through which entrained air passes, a filter being provided between the inlet and the outlet which filters insects from the entrained air, and means creating a pressure differential between the inlet and outlet. of the device such that air and insects can be entrained in the inlet and drawn through the duct portion towards the filter of the device, the passage of air between the air inlet and the filter being substantially unhindered, such that insects entrained into the duct and retained against the filter when the means creating the pressure differential is operative can escape from the device when the means creating the pressure differential is inoperative or reversed, and characterised in that said hollow duct portion comprises a slightly tapering hollow tubular portion and a hollow sleeve, the hollow tubular portion forming part of a housing with the filter located at a free end thereof, the hollow sleeve frictionally engaging over the hollow tubular portion, said hollow tubular portion, said hollow sleeve and said filter being of substantially equal dimensions.

Preferably the means creating the pressure differential is a fan, impeller or the like.

Further preferably, the filter comprises a gauze or mesh which allows air flow therethrough but which prevents particulate items such as insects and detritus from passing.

Most preferably the device is battery powered. In a particularly preferred embodiment, the motor can be driven in either a forward or a reverse direction, operation in a first of these directions causes air entrainment into the inlet of the device and expulsion from the outlet, and operation in the alternate of these directions cause air to be expelled from the inlet end of the device. In this manner, insects and detritus and the like can be sucked into the device, and then forcibly expelled therefrom at the choice of the user.

It is preferable that the air flow is substantially unhindered from the inlet end of the device to the filter, although it is foreseen by the applicant that the internal surface of the duct portion may be provided with staggered protrusions past which the air can flow in an albeit uninterrupted manner.

Preferably, the power of the motor is such that a pressure differential between the inlet and outlet ends of the device is achieved which is sufficient to entrain air and insects into the inlet, but which is insufficient to cause any harm to the insects as they impact against and are retained on said filter means during operation of the fan.

The inventor hereof has realised that the provision of a deflectable flap as in U.S. Pat No. 4,918,857 is an unnecessary and expensive modification to the device proposed herein, and furthermore the humane disposal of insects entrained into the device of the present invention resents a significant advantage.

BRIEF DESCRIPTION OF THE DRAWING

A specific embodiment of the present invention is now provided by way of example with reference to the accompanying diagrams wherein:

FIG. 1 shows a first exploded perspective view of the device according to the invention, FIG. 2 shows a second partially exploded perspective view of the device according to the invention from a different angle from that of FIG. 1, FIG. 3 shows a sectional view of the connection of components in the region of the air outlet of the device shown in FIG. 4, FIG. 4 shows a sectional view of the completed device, FIG. 4A shows an end elevation of the device, FIG. 5 shows a sectional view of the device on L—L as shown in FIG. 4A, FIGS. 6 and 7 show different perspective views of the handle component of the device.

DETAILED DESCRIPTION

Figure 7:
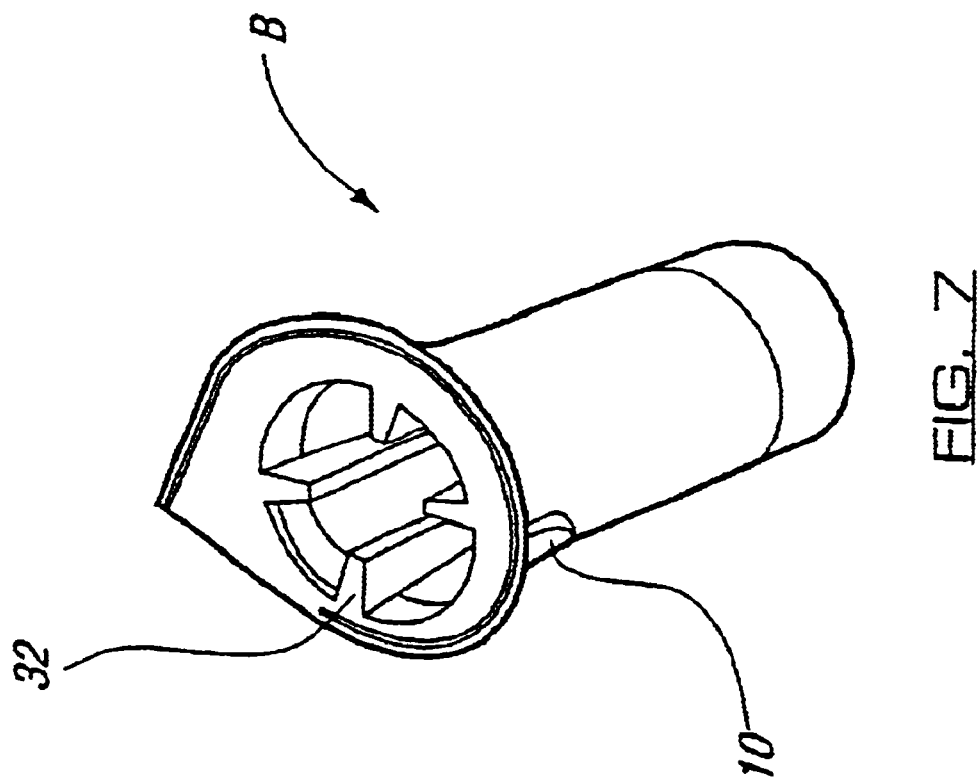
Figure 6:
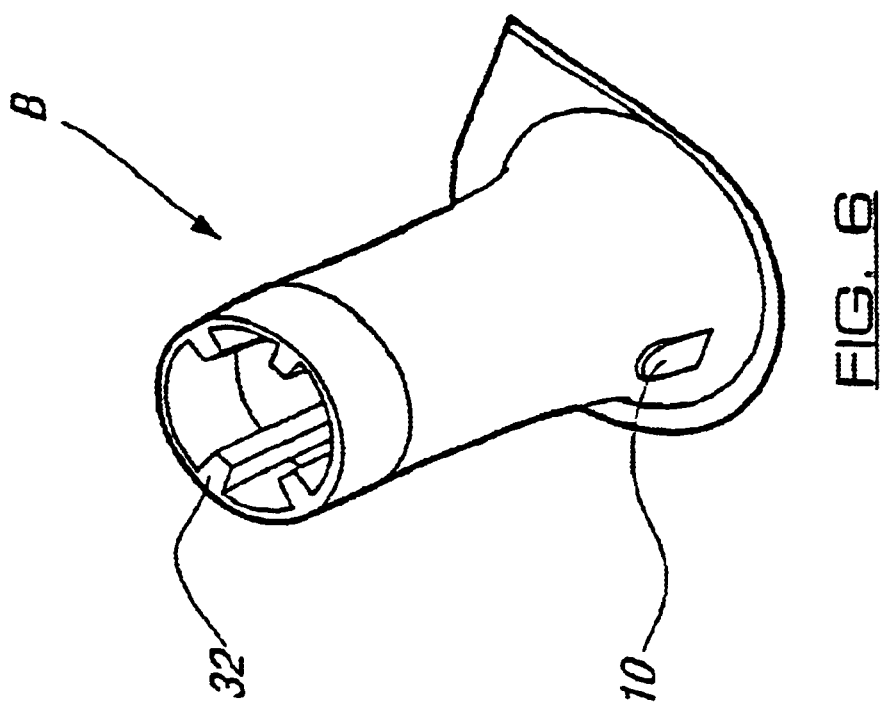
Figure 9:
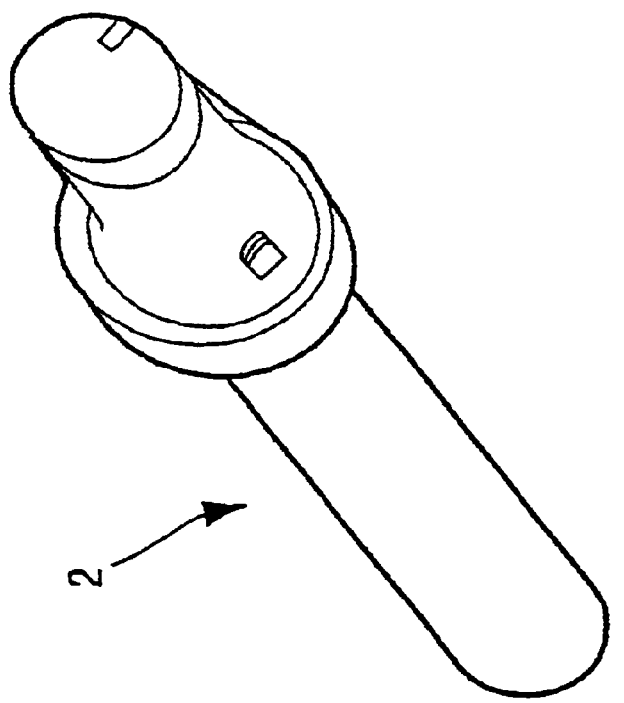
FIGS. 8 and 9 show further different perspective views of the device when assembled.
Figure 8:
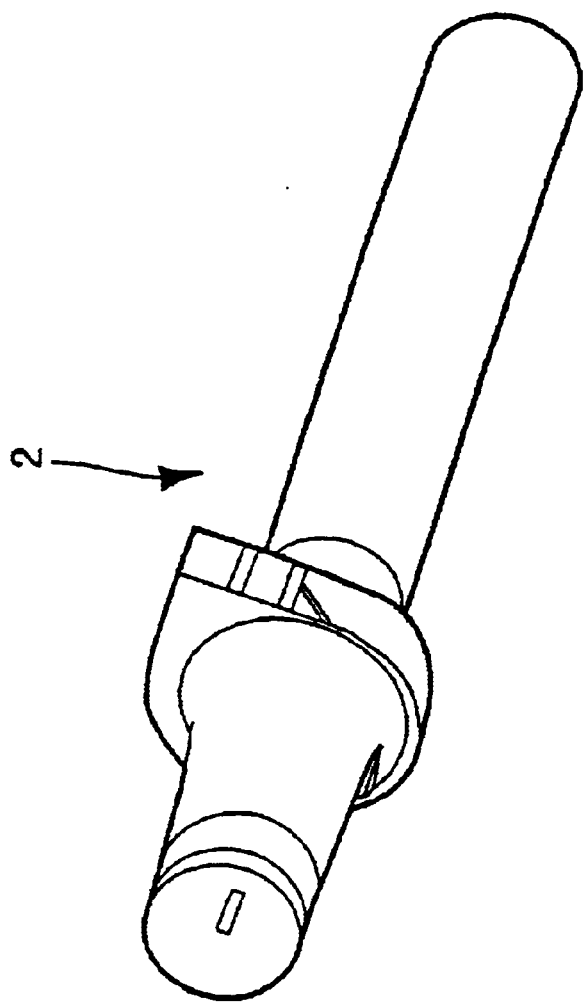

Referring firstly to FIG. 1, there is shown the various different components of an insect catching device 2. The device has an end cap 4, a battery 6, and a handle portion 8 having an internal cavity 9 inside which the battery 6 is disposed. A user depressable switch that is schematically represented in the Figures as switch 10 is provided in the handle portion and is either integrally molded therewith or provided as a separate component, but in any event the switch can pivot or move in its mounting in the handle portion 8 to cause deflection of a limb 11 of a metal contact 12 above a terminal 14 disposed towards the rear end of a motor unit 16. When the limb 11 and the terminal 14 come into contact, the motor is activated.

Motor unit 16 is provided with a spindle 18 which is connected to an impeller 20 which when rotating gives rise to a pressure differential thereacross, ultimately resulting in the entrainment of air through an open inlet end of the device. The impeller 20 is contained within an impeller housing 24 which is provided with a slightly tapering tubular hollow portion 26 which opens internally of the impeller housing above the impeller 20. Said impeller housing 24 has a peripheral wall 28 which is provided with a number of apertures 30 at a predetermined position around the impeller housing through which air drawn through said impeller housing can be expelled. A hollow sleeve 31, one end of which forms the air inlet 22 to the device frictionally engages over the tapering tubular portion 26, and together the two components 26, 31 define the duct portion of the device through which air is drawn by the impeller 20.

In FIG. 2, the internal structure of the handle portion is partially visible and is provided with a plurality of fins 32, which support and frictionally engage with the external surface of the motor unit and also the battery. The end cap 4 snap fits into the open end of the handle portion by means of a pair of deflectable tabs, one of which is shown at 34. In addition, staggered protrusions 33 are shown schematically and in phantom within hollow sleeve 31.

In FIGS. 4 and 5, there is shown a gauze 36 through which air flow is substantially unhindered (and thus over which there is negligible pressure drop) but which prevents insects and other detritus sucked into the inlet within the entrained air flow from passing therethrough and into the impeller 20. It is to be mentioned that the filtering gauze could be positioned at any desired position along the length of the hollow duct portion of the device, but the device will be most efficacious if the gauze is disposed proximate the impeller 20.

In use, the switch 10 is depressed to force a contact between the limb 11 of contact 12 and the terminal 14 of the motor unit 16. The making of this contact causes the power from the battery 6 to be fed to the motor unit 16 thus causing rotation of the spindle 18, and the impeller 20 connected thereto. This in turn causes a pressure differential across the impeller resulting in the creation of a partial vacuum in the hollow portion of the device 2 upstream of the impeller and thus air is entrained into the open end 22 of the device and sucked through the device before ultimately being expelled through the apertures 30 which form the air outlet of the device.

A user thus simply starts the flow of air through the device, and if an insect gets caught in the air flow entering the open end 22 of the device it is drawn thereinto and retained humanely against the gauze 36 during the continued air flow. Once the insect has been collected and is retained in the device by virtue of the air flow, the user can move with the device to a suitable disposal area and release the switch so that the insect is no longer held against the gauze by the air flow therethrough. For example, if a user collected an insect inside a domestic residence, he would walk outside before releasing the switch and either upending the device and tipping the collected insect on the floor or earth, or simply waiting until the insect flew upwardly and out of the hollow duct portion and open end 22.

The present invention can be used to capture both flying insects, such as flies, bees or wasps and non-flying insects such as spiders, woodlice or cockroaches.

Although the invention has been described in terms of specific embodiments and applications, persons skilled in the art may, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof. In addition, although the forgoing description provided reference to devices for the collection and disposal of insects and particularly living house flies, such description in no way limits the extent of application of the invention.

What is claimed is:

1. A device for the collection and disposal of insects and similarly sized detrital objects, the device comprising:

a hollow duct portion having a substantially uniform internal diameter and an inlet end through which air enters said hollow duct portion, the air passing through said hollow duct portion being entrained in said hollow duct portion;

an air outlet from which said entrained air is expelled, there being provided an elongated entrained air path between the inlet end of said hollow duct portion and said air outlet;

a filter interposed in the elongated entrained air path between the inlet end of said hollow duct portion and said air outlet for filtering the insects and similarly sized detrital objects from the entrained air;

an impeller for creating a pressure differential across the elongated entrained air path between the inlet end of said hollow duct portion and said air outlet of the device such that air, insects, and similarly sized detrital objects are entrained in the inlet end of said hollow duct portion and drawn through the hollow duct portion towards said filter; and a mechanical drive arrangement coupled to said impeller for energizing said impeller to create the pressure differential, said mechanical drive arrangement being arranged outside of the elongated entrained air path;

whereby the passage of entrained air through a portion of the elongated entrained air path between the inlet end of said hollow duct portion and said filter is substantially unhindered such that insects that are entrained into the duct and retained against the filter when the impeller for creating the pressure differential is operative can escape from the device when the impeller for creating the pressure differential is inoperative or reversed, said hollow duct portion further having both a slightly tapering hollow tubular portion forming a part of a housing with said filter located at a free end thereof and a hollow sleeve frictionally engaging over said hollow tubular portion, said hollow sleeve and said filter being of substantially equal dimensions.

2. A device according to claim 1 wherein the impeller for creating the pressure differential is a fan.

3. A device according to claim 1 wherein said filter comprises a gauze or mesh that allows air flow therethrough and prevents the insects and similarly sized detrital objects from passing therethrough.

4. A device according to claim 1 wherein the device for the collection and disposal of insects and similarly sized detrital objects is battery powered.

5. A device according to claim 1 wherein said mechanical drive arrangement is a motor for driving rotatively said impeller.

6. A device according to claim 5 wherein said motor is arranged to be driven in a forward direction for causing air entrainment into the inlet end of said hollow duct portion and expulsion of air from said air outlet.

7. A device according to claim 6 wherein the power of said motor is sufficient to create the pressure differential between the inlet end of said hollow duct portion and said air outlet of the device, and insufficient to cause harm to the insects as they impact against, and are retained on, said filter during operation of said impeller in the forward direction.

8. A device according to claim 5 wherein said motor is arranged to be driven in a reverse direction for causing air to be expelled from the inlet end of the device.

9. A device according to claim 1 wherein the internal surface of said hollow duct portion is provided with staggered protrusions past which the entrained air cna flow in an uniterrupted manner.

* * * * *

UNITED STATES PATENT AND TRADEMARK OFFICE
CERTIFICATE OF CORRECTION

PATENT NO. : 6,640,489 B1
DATED : November 4, 2003
INVENTOR(S) : David Boulton

It is certified that error appears in the above-identified patent and that said Letters Patent is hereby corrected as shown below:

Column 3,
Line 5, delete "resents" and insert therefor -- represents --;

Column 4,
Lines 41-42, insert (paragraph):
-- Although not specifically shown in the drawings, the motor unit could be reversible and the impeller could be designed to create a pressure differential thereacross depending on the particullar direction of rotation. In this configuration, the user could depress a secondary switch, or could depress the switch 10 in an alternate manner so as to cause opposite rotation of the impeller and thus cause the collected insect to be blown out of the open end 22 of the device.. --;
Line 51, delete "vides" and insert therefor -- vided --;

Column 5,
Line 25, delete "and a" and insert therefor -- , said --; and

Column 6,
Line 26, delete "cna" and insert therefor -- can --.

Signed and Sealed this

Fifteenth Day of June, 2004

JON W. DUDAS
*Acting Director of the United States Patent and Trademark Office*